(12) United States Patent
Lansonneur et al.

(10) Patent No.: US 12,447,356 B2
(45) Date of Patent: Oct. 21, 2025

(54) RADIATION THERAPY TREATMENT PLANNING AND RADIATION THERAPY TREATMENT INCLUDING MU DISTRIBUTION VISUALIZATION

(71) Applicant: Varian Medical Systems, Inc., Palo Alto, CA (US)

(72) Inventors: Pierre Lansonneur, Lyons (FR); Michael Folkerts, Costa Mesa, CA (US)

(73) Assignee: VARIAN MEDICAL SYSTEMS, INC., Palo Alto, CA (US)

( * ) Notice: Subject to any disclaimer, the term of this patent is extended or adjusted under 35 U.S.C. 154(b) by 197 days.

(21) Appl. No.: 18/467,054

(22) Filed: Sep. 14, 2023

(65) Prior Publication Data

US 2025/0090863 A1   Mar. 20, 2025

(51) Int. Cl.
*A61N 5/10* (2006.01)
*G16H 20/40* (2018.01)

(52) U.S. Cl.
CPC .......... *A61N 5/1031* (2013.01); *A61N 5/103* (2013.01); *A61N 5/1048* (2013.01); *G16H 20/40* (2018.01); *A61N 2005/1074* (2013.01); *A61N 2005/1087* (2013.01)

(58) Field of Classification Search
CPC .... A61N 5/103; A61N 5/1031; A61N 5/1048; A61N 2005/1074; A61N 2005/1087; G16H 20/40
See application file for complete search history.

(56) References Cited

U.S. PATENT DOCUMENTS

2004/0165696 A1   8/2004  Lee
2021/0393982 A1   12/2021 Lansonneur et al.
2023/0310888 A1   10/2023 Lansonneur et al.

OTHER PUBLICATIONS

Van de Water, S. et al., "Shortening delivery times for intensity-modulated proton therapy by reducing the number of proton spots: an experimental verification," Physics in Medicine & Biology, 2020.

*Primary Examiner* — Mark R Gaworecki
(74) *Attorney, Agent, or Firm* — Harness, Dickey & Pierce, P.L.C.

(57) ABSTRACT

A system includes at least one processor configured to execute computer executable instructions to cause the system to: generate or obtain a first radiation treatment plan for a treatment target in a patient, the first radiation treatment plan prescribing beam characteristics for a plurality of beamlets or spots in the treatment target, the beam characteristics including a monitor unit value associated with each of the plurality of beamlets or spots in at least a first field; and display, via a graphical user interface, at least one representation of a first distribution of monitor units for the first radiation treatment plan, the at least one representation of the first distribution of monitor units indicating, for each respective monitor unit value, a number of beamlets or spots in at least the first field having the respective monitor unit value.

20 Claims, 14 Drawing Sheets

RADIATION THERAPY TREATMENT PLANNING AND RADIATION THERAPY TREATMENT INCLUDING MU DISTRIBUTION VISUALIZATION

TECHNICAL FIELD

One or more example embodiments relate to radiation therapy treatment planning and radiation therapy treatment.

BACKGROUND

Radiation therapy involves directing a beam of high energy proton, photon, ion, or electron radiation into a target volume in a treatment target of unhealthy tissue (e.g., a tumor or lesion).

Before performing radiation therapy on a patient, a treatment plan specific to that patient is developed. The treatment plan defines various aspects of the radiation therapy using simulations and optimizations that may be based on past experiences. In general, the purpose of the treatment plan is to deliver sufficient radiation to unhealthy tissue while minimizing exposure of surrounding healthy tissue to that radiation.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

Independent of the grammatical term usage, individuals with male, female or other gender identities are included within the term.

At least one example embodiment provides a system comprising: at least one processor and a memory storing computer executable instructions. The at least one processor is configured to execute the computer executable instructions to cause the system to: generate or obtain a first radiation treatment plan for a treatment target in a patient, the first radiation treatment plan prescribing beam characteristics for a plurality of beamlets or spots in the treatment target, the beam characteristics including a monitor unit value associated with each of the plurality of beamlets or spots in at least a first field; and display, via a graphical user interface, at least one representation of a first distribution of monitor units for the first radiation treatment plan, the at least one representation of the first distribution of monitor units indicating, for each respective monitor unit value, a number of beamlets or spots in at least the first field having the respective monitor unit value.

At least one other example embodiment provides a system comprising: means for generating, and/or means for obtaining, a first radiation treatment plan for a treatment target in a patient, the first radiation treatment plan prescribing beam characteristics for a plurality of beamlets or spots in the treatment target, the beam characteristics including a monitor unit value associated with each of the plurality of beamlets or spots in at least a first field; and means for displaying, via a graphical user interface, at least one representation of a first distribution of monitor units for the first radiation treatment plan, the at least one representation of the first distribution of monitor units indicating, for each respective monitor unit value, a number of beamlets or spots in at least the first field having the respective monitor unit value.

At least one other example embodiment provides a method comprising: generating or obtaining a first radiation treatment plan for a treatment target in a patient, the first radiation treatment plan prescribing beam characteristics for a plurality of beamlets or spots in the treatment target, the beam characteristics including a monitor unit value associated with each of the plurality of beamlets or spots in at least a first field; and displaying, via a graphical user interface, at least one representation of a first distribution of monitor units for the first radiation treatment plan, the at least one representation of the first distribution of monitor units indicating, for each respective monitor unit value, a number of beamlets or spots in at least the first field having the respective monitor unit value.

At least one other example embodiment provides a non-transitory computer-readable storage medium storing computer executable instructions that, when executed by at least one processor at a system, cause the system to perform a method comprising: generating or obtaining a first radiation treatment plan for a treatment target in a patient, the first radiation treatment plan prescribing beam characteristics for a plurality of beamlets or spots in the treatment target, the beam characteristics including a monitor unit value associated with each of the plurality of beamlets or spots in at least a first field; and displaying, via a graphical user interface, at least one representation of a first distribution of monitor units for the first radiation treatment plan, the at least one representation of the first distribution of monitor units indicating, for each respective monitor unit value, a number of beamlets or spots in at least the first field having the respective monitor unit value.

At least one example embodiment provides a system comprising: at least one processor and a memory storing computer executable instructions. The at least one processor is configured to execute the computer executable instructions to cause the system to: generate a first candidate radiation treatment plan for a treatment target in a patient, the first candidate radiation treatment plan prescribing first beam characteristics for a plurality of beamlets or spots in the treatment target, the first beam characteristics including a first monitor unit value associated with each of the plurality of beamlets or spots; generate a second candidate radiation treatment plan for the treatment target in the patient, the second candidate radiation treatment plan prescribing second beam characteristics for the plurality of beamlets or spots in the treatment target, the second beam characteristics including a second monitor unit value associated with each of the plurality of beamlets or spots; display, via a graphical user interface, a at least one representation of a first distribution of monitor units for the first candidate radiation treatment plan, the at least one representation of the first distribution of monitor units indicating, for each respective first monitor value, a first number of beamlets or spots having the respective first monitor unit value; and display, via the graphical user interface, at least one representation of a second distribution of monitor units for the second candidate radiation treatment plan, the at least one representation of the second distribution of monitor units indicating, for each respective second monitor value, a second number of beamlets or spots having the respective second monitor unit value.

At least one example embodiment provides a system comprising: means for generating (or obtaining) a first candidate radiation treatment plan for a treatment target in a patient, the first candidate radiation treatment plan prescribing first beam characteristics for a plurality of beamlets or spots in the treatment target, the first beam characteristics including a first monitor unit value associated with each of the plurality of beamlets or spots; means for generating (or obtaining) a second candidate radiation treatment plan for the treatment target in the patient, the second candidate radiation treatment plan prescribing second beam characteristics for the plurality of beamlets or spots in the treatment target, the second beam characteristics including a second monitor unit value associated with each of the plurality of beamlets or spots; means for displaying, via a graphical user interface, a at least one representation of a first distribution of monitor units for the first candidate radiation treatment plan, the at least one representation of the first distribution of monitor units indicating, for each respective first monitor value, a first number of beamlets or spots having the respective first monitor unit value; and means for displaying, via the graphical user interface, at least one representation of a second distribution of monitor units for the second candidate radiation treatment plan, the at least one representation of the second distribution of monitor units indicating, for each respective second monitor value, a second number of beamlets or spots having the respective second monitor unit value.

At least one example embodiment provides a method comprising: generating (or obtaining) a first candidate radiation treatment plan for a treatment target in a patient, the first candidate radiation treatment plan prescribing first beam characteristics for a plurality of beamlets or spots in the treatment target, the first beam characteristics including a first monitor unit value associated with each of the plurality of beamlets or spots; generating (or obtaining) a second candidate radiation treatment plan for the treatment target in the patient, the second candidate radiation treatment plan prescribing second beam characteristics for the plurality of beamlets or spots in the treatment target, the second beam characteristics including a second monitor unit value associated with each of the plurality of beamlets or spots; displaying, via a graphical user interface, a at least one representation of a first distribution of monitor units for the first candidate radiation treatment plan, the at least one representation of the first distribution of monitor units indicating, for each respective first monitor value, a first number of beamlets or spots having the respective first monitor unit value; and displaying, via the graphical user interface, at least one representation of a second distribution of monitor units for the second candidate radiation treatment plan, the at least one representation of the second distribution of monitor units indicating, for each respective second monitor value, a second number of beamlets or spots having the respective second monitor unit value.

At least one other example embodiment provides a non-transitory computer-readable storage medium storing computer executable instructions that, when executed by at least one processor at a system, cause the system to perform a method comprising: generating (or obtaining) a first candidate radiation treatment plan for a treatment target in a patient, the first candidate radiation treatment plan prescribing first beam characteristics for a plurality of beamlets or spots in the treatment target, the first beam characteristics including a first monitor unit value associated with each of the plurality of beamlets or spots; generating (or obtaining) a second candidate radiation treatment plan for the treatment target in the patient, the second candidate radiation treatment plan prescribing second beam characteristics for the plurality of beamlets or spots in the treatment target, the second beam characteristics including a second monitor unit value associated with each of the plurality of beamlets or spots; displaying, via a graphical user interface, a at least one representation of a first distribution of monitor units for the first candidate radiation treatment plan, the at least one representation of the first distribution of monitor units indicating, for each respective first monitor value, a first number of beamlets or spots having the respective first monitor unit value; and displaying, via the graphical user interface, at least one representation of a second distribution of monitor units for the second candidate radiation treatment plan, the at least one representation of the second distribution of monitor units indicating, for each respective second monitor value, a second number of beamlets or spots having the respective second monitor unit value.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
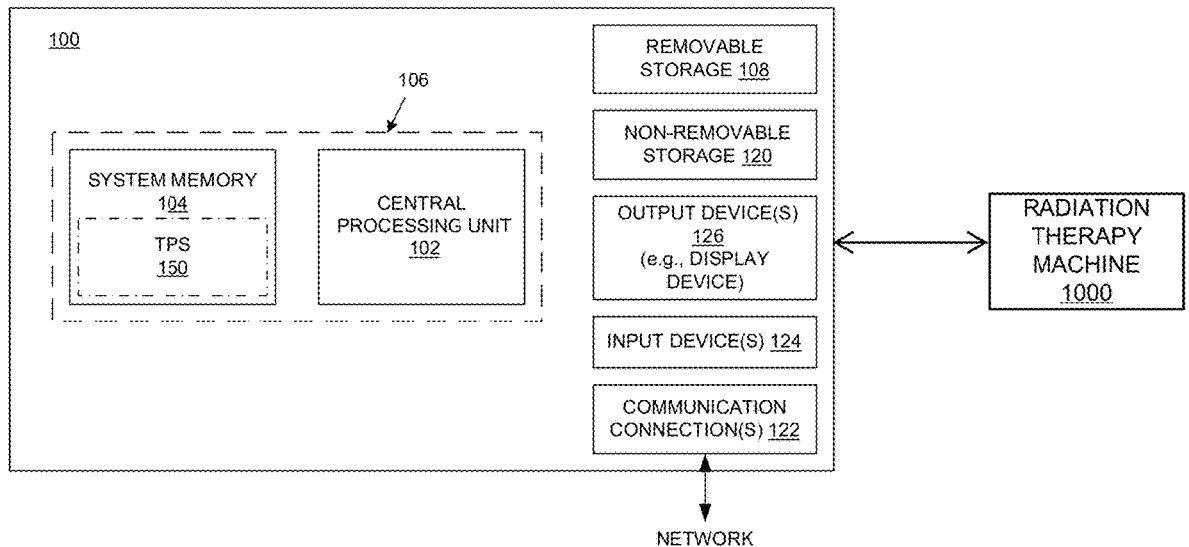
FIG. 1 is a block diagram of an example of a system upon which example embodiments may be implemented.

It should be noted that these figures are intended to illustrate the general characteristics of methods, structure and/or materials utilized in certain example embodiments and to supplement the written description provided below.

These drawings are not, however, to scale and may not precisely reflect the precise structural or performance characteristics of any given embodiment and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

As discussed herein the terminology "one or more" and "at least one" may be used interchangeably.

As discussed herein the a radiation therapy treatment plan may also be referred to as a radiation treatment plan, a treatment plan or a plan. Moreover, the terms "proposed" and "candidate" may be used interchangeably in the context of a radiation therapy treatment plan.

It will be appreciated that a number of example embodiments may be used in combination.

Unless specifically stated otherwise as apparent from the following discussion, it is appreciated that throughout the present disclosure, discussions utilizing terms such as "accessing," "determining," "storing," "assigning," "adjusting," "combining," "summing," "adding," "optimizing," "minimizing," "producing," "generating," "identifying," "setting," "increasing," "evaluating," "calculating," or the like, may refer to actions and processes of a computer system or similar electronic computing device or processor. The computer system or similar electronic computing device manipulates and transforms data represented as physical (electronic) quantities within the computer system memories, registers or other such information storage, transmission or display devices.

The discussion to follow may include terms such as "weight," "metric," "intensity," "monitor unit," etc. Unless otherwise noted, a value is associated with each such term. For example, a weight (e.g., a weight of a spot or beamlet) has a value, and a metric has a value. For simplicity, the term "weight" or "metric" or "intensity" or "monitor unit" may refer to a value of the weight or metric or intensity or MU itself, unless otherwise noted or apparent from the discussion.

As discussed herein, a "representation" may refer to a graphical or visual representation, such as a histogram, density chart and/or color density chart. Although example embodiments may be discussed herein with regard to histograms or density charts, however, example embodiments should not be limited to these example representations.

FIG. 1 shows a block diagram of an example of a system upon which one or more example embodiments may be implemented. The system includes a computer system 100 and a radiation therapy machine 1000 in two-way communication with one another.

The radiation therapy machine 1000 may be a treatment modality for providing radiation therapy treatment, such as intensity modulated radiation therapy (IMRT) or intensity modulated particle therapy (IMPT). These radiation therapy treatments will be discussed in more detail below.

The computer system 100 includes at least one processing unit 102, memory 104, removable storage 108, non-removable storage 120, and communications connection(s) 122 to enable the system to communicate with other devices (e.g., in a networked environment using logical connections to one or more remote computers).

The system 100 further includes one or more input devices 124 (e.g., a keyboard, mouse, pen, voice input device, touch screen or other input device, etc.) and one or more output devices 126, such as a display device, speakers, printer, etc. A display device may be, for example, a cathode ray tube display, a light-emitting diode display, a liquid crystal display, a touch screen display, a combination thereof, or the like. As will be discussed more later, according to one or more example embodiments, the output devices 126 may include a display device configured to display a graphical user interface (GUI) rendering of one or more representations of one or more distributions of MUs (also referred to as MU distributions) for one or more radiation therapy treatment plans.

In FIG. 1, the memory 104 includes computer-readable instructions, data structures, program modules, and the like associated with a treatment planning system (TPS) 150, which may also be referred to as an optimizer. However, the TPS 150 may instead reside in any one of the computer storage media used by the system 100, or may be distributed over some combination of the computer storage media, or may be distributed over some combination of networked computers. The TPS 150 is configured to generate, optimize and evaluate candidate (proposed) treatment plans and produce a final (optimized) treatment plan. The final treatment plan may be utilized to apply, via the radiation therapy machine 1000, radiation therapy treatment to a treatment target of a patient.

More specifically, for example, the TPS 150 defines a proposed radiation treatment plan, which is stored in a computer system memory and accessed from that memory. As mentioned above, treatment modalities for the treatment plans include intensity modulated radiation therapy (IMRT) and intensity modulated particle therapy (IMPT).

In IMRT embodiments, a photon beam includes a number of beam segments or beamlets. The beam is shaped using multi-leaf collimators (MLCs) either before or while the beam is directed into the treatment target. In one or more such embodiments, a maximum energy (e.g., 20 MeV) for the beam is specified, and an energy for each of the beamlets is determined as a percentage (100 percent or less) or equivalent fraction of the maximum beam energy. Thus, each of the beamlets can be weighted based on its energy level. By weighting based on the energy per beamlet, each beamlet is in effect also weighted based on its intensity.

In IMPT (e.g., spot or pencil beam scanning) embodiments, a proton or ion beam is directed to spots in a treatment target as prescribed by the treatment plan. The prescribed spot locations are typically arranged in a fixed (raster) pattern for each energy layer of the beam, and the beam is delivered on a fixed scanning path within an energy layer. Each spot can be weighted based on, for example, the number of protons it receives when irradiated by the beam.

The weight of each spot may be expressed as a value of a monitor unit (e.g., number of protons) or MU.

A candidate radiation therapy treatment plan includes values of parameters that can affect dose and/or dose rate, as well as other parameters. Depending on the treatment modality, the parameters may include, but are not limited to: beam shape (collimation); number and arrangement of spots for spot (pencil beam) scanning, and spot weights; beamlet weights; beamlet intensities or energies; beam/beamlet directions; prescribed dose and prescribed dose rate; a number of irradiations of a target volume; a duration of each of the irradiations (irradiation times); and a dose deposited in each of the irradiations. The parameters may also include a period of time during which the irradiations are applied (e.g., a number of irradiations are applied over a period of time such as an hour, with each irradiation in the period of time separated from the next by another period of time) and an interval of time between each period of irradiations (e.g., each hour-long period is separated from the next by a day).

The large number of parameters and their ranges of values can lead to an effectively infinite number of potential treatment plans. Therefore, consistently and efficiently generating and evaluating high-quality treatment plans is beyond the capability of a human and relies on and/or requires the use of a computing system.

To deliver the prescribed dose/dose rate of radiation, the radiation treatment plan may be converted (e.g., by the TPS 150) into machine parameters for a radiation therapy machine (e.g., radiation therapy machine 1000). Machine parameters can include, for example, beam currents of a proton, ion, or photon beam, the number of protons, ions, or photons per time segment to be emitted by the accelerator, magnet currents, settings to achieve the prescribed energy of protons, ions, or photons at the target volume, and the measurement range of a dose monitor system. This conversion thus takes into account the limitations of the treatment machine's equipment that produces the beam and that delivers and monitors the radiation treatment.

During treatment, a beam enters a nozzle of the radiation therapy machine 1000, which may include one or more components that affect (e.g., decrease, modulate, etc.) the energy of the beam, to control the dose/dose rate delivered by the beam and/or to control the dose versus depth curve of the beam, depending on the type of beam. For example, for a proton beam or an ion beam that has a Bragg peak, the nozzle can control the location of the Bragg peak in the treatment target laterally to the beam axis. In other examples, energy modulation is performed outside of the nozzle (e.g., upstream of the nozzle).

The nozzle is mounted on a moveable gantry so that the beam may be delivered from different directions (angles) relative to a patient (or treatment target of the patient) on the patient support device, and the position of the patient support device relative to the beam may also be changed.

Figure 2A:
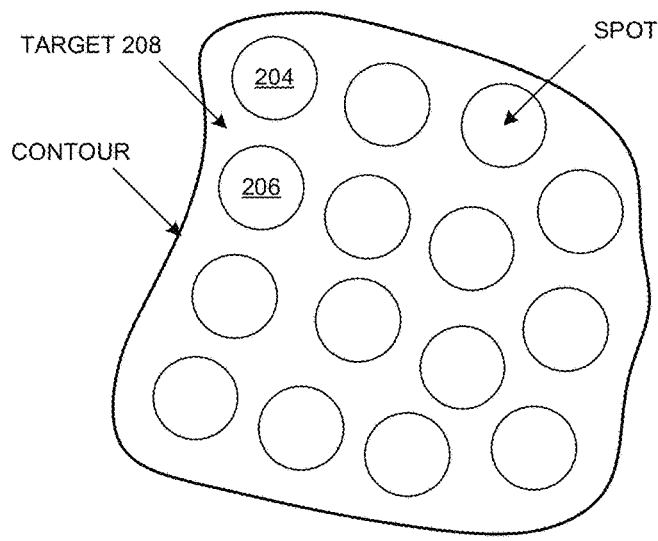
FIGS. 2A and 2B illustrate examples of a beam's eye view of a treatment target according to example embodiments.

FIG. 2A illustrates an example of a beam's eye view of a treatment target 208 in some (e.g., IMPT) example embodiments. The treatment target 208 may coincide with the shape of the volume being treated (e.g., the contour of the treatment target may coincide with the contour of a tumor), the treatment target may be larger than the volume being treated, or the treatment target may correspond to a portion (e.g., a sub-volume) of the volume being treated.

In these example embodiments, an arrangement of spots (e.g., spots 204 and 206) is mapped onto the treatment target 208. Each spot corresponds to a particular location in the treatment target 208. The spots in the treatment target 208 may be irradiated with a raster scan (two-dimensional emission) of a spot scanning beam (pencil beam). Generally speaking, a first pencil beam is aimed at the first spot 204 in the treatment target 208, a dose rate is delivered to that spot, then a second pencil beam is aimed at the second spot 206 in the treatment target, a dose rate is delivered to the second spot 206, and so on. Spots with a weight or MU value of zero are not irradiated.

Each spot scanning beam can deliver a relatively high dose rate (a relatively high dose in a relatively short period of time) to each spot. For example, if necessary, the spot scanning beam can deliver above 40 grays (Gy) to each spot in less than one second.

Figure 2B:
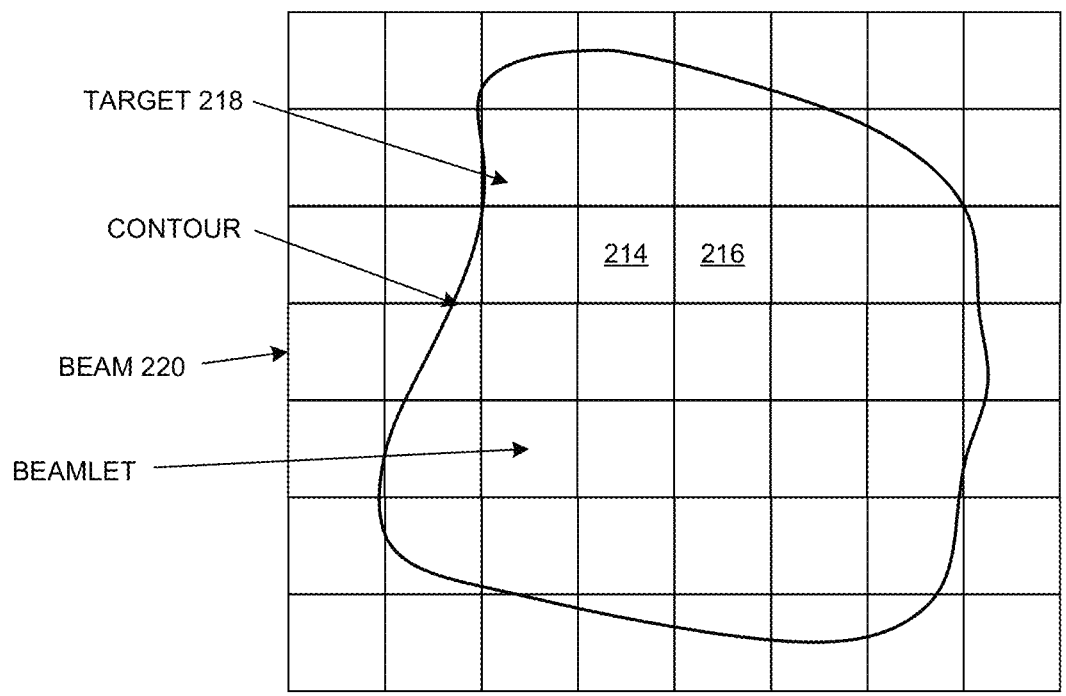

FIG. 2B illustrates an example of a beam's eye view of a treatment target 208 in other (e.g., IMRT) example embodiments. In these example embodiments, the beam 220 that is used to irradiate the treatment target 208 includes an array of beamlets (e.g., the beamlets 214 and 216) that is mapped onto the treatment target 208. Each beamlet corresponds to a particular location in the treatment target 208. A maximum energy for the beam 220 is specified, and an energy for each of the beamlets 214, 216, etc., is determined as a percentage or fraction of the maximum beam energy.

Each beamlet can deliver a relatively high dose rate (a relatively high dose in a relatively short period of time). For example, if necessary, each beamlet can deliver above 40 grays (Gy) in less than one second. Beamlets with a weight or MU of zero are not used during treatment.

Figure 3:
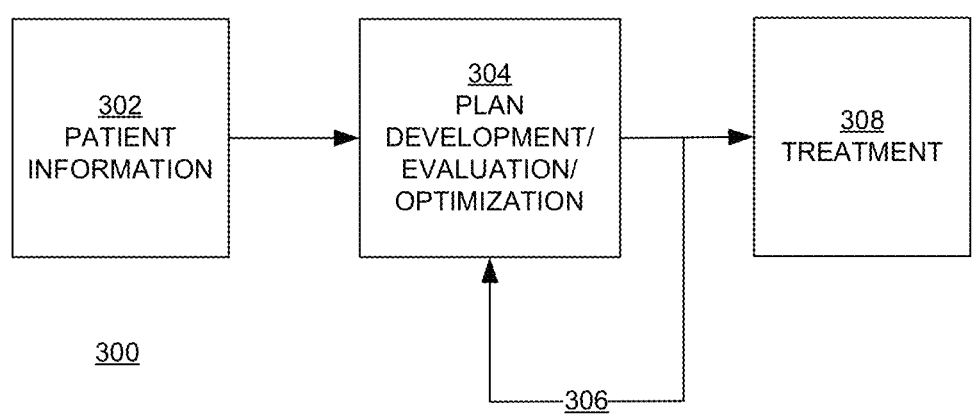
FIGS. 3 and 4 are block diagrams illustrating examples of an automated radiation therapy treatment planning process according to example embodiments.

FIG. 3 is a block diagram illustrating an example of an automated radiation therapy treatment planning process 300, according to example embodiments. The process 300, in whole or in part, may be implemented as a software program, hardware logic, or a combination thereof on/using the computer system 100 in FIG. 1.

Referring to FIG. 3, in step 302 the computer system 100 obtains three-dimensional (3D) images of a patient, and segments and contours organs and other structures in the patient (the patient geometry). In steps 304 and 306, as will be discussed in more detail below with regard to FIG. 4, the system 100 develops and evaluates a radiation therapy treatment plan based on the information obtained in step 302, and other information.

In step 308, if the treatment plan developed by the system 100 is satisfactory (e.g., satisfies clinical goals), then the radiation therapy treatment plan may be used for treatment of the treatment target of the patient (e.g., using the radiation therapy machine 1000). If not, then the system 100 may iteratively modify aspects of the treatment plan and/or of the clinical goals until a satisfactory plan is generated, and then utilize the satisfactory radiation therapy treatment plan for treatment of the patient (e.g., using the radiation therapy machine 1000). The clinical goals may be expressed in terms of, for example, a set of quality metrics, such as target homogeneity, conformity to the treatment target, critical organ sparing, and the like, with respective target values for the quality metrics.

Figure 4:
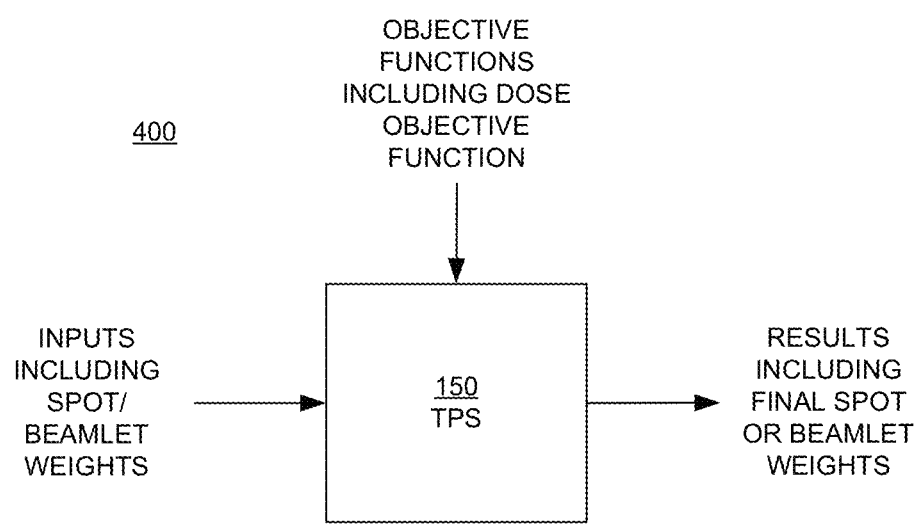

FIG. 4 is a block diagram illustrating an example of an automated radiation therapy treatment planning process 400, according to example embodiments. The process 400, in whole or in part, may be implemented as a software program, hardware logic, or a combination thereof on/using the system 100 of FIG. 1. For example, the process 400 may be performed at the TPS 150. The process 400 corresponds generally to steps 304 and 306 in FIG. 3.

Referring to FIG. 4, the TPS 150 accesses or receives (e.g., from the memory 104 of FIG. 1) information that includes parameters such as those mentioned above. The TPS 150 may also access or receive information specific to the patient to be treated (e.g., patient geometry), including information that describes a treatment target (region of interest, ROI), which may include a planned target volume (PTV), gross tumor volume (GTV), clinical target volume (CTV), and/or organs-at-risk (OARs).

The TPS 150 also accesses or receives objective functions defined for the treatment of the patient. Objective functions are mathematical formulations of variables (parameters such as those mentioned above) that may have an effect on achieving specified clinical goals. More specifically, the objective functions are used to evaluate proposed radiation therapy treatment plans to determine whether or not the clinical goals that are specified for treatment of a patient are satisfied.

An example of a dose objective function f(d) is: $f(d)=\Sigma (w_i)(d_i-d_p)^2$, where $w_i$ is a weight per voxel in a treatment target, $d_i$ is the dose per voxel projected to be received according to a proposed treatment plan, $d_p$ is the prescribed dose per voxel, and the summation $\Sigma$ is over all voxels i in the treatment target. A voxel may be a spot in the treatment target irradiated by a spot scanning beam, or may correspond to a location in the treatment target into which a beamlet is directed. In this example, the goal is to minimize the value of the dose objective function (in this example, the dose across the treatment target becomes more uniform as the value of the function decreases). In practice, there may be several objective functions (in addition to the dose objective function) that are to be minimized in order to achieve an optimal final treatment plan. The objective functions may conflict with each other; that is, minimizing one objective function may penalize another objective function, and so minimizing all of the objective functions may not be achievable. Thus, in example embodiments, the objective functions may be weighted and summed to provide a total of all of the objective functions, and that total may then be minimized.

Still referring to FIG. 4, in some (e.g., IMPT) example embodiments, the information accessed or received by the TPS 150 may include, but is not limited to, the number and positions (pattern or arrangement) of spots, a value (e.g., an initial value) of a weight for each spot in the treatment target, and a dosimetric objective function that accounts for the dose objective for the PTV and OARs. The weight of each spot may be expressed as a value of a monitor unit (MU) corresponding to, for example, the number of particles (e.g., protons or ions) per spot. As noted above with regard to FIG. 2A, each spot corresponds to a location in the treatment target. As such, each spot weight can be referred to as a "locational" weight or location-based weight: a spot corresponds to a location, a weight corresponds to the spot, and thus the spot weight corresponds to the location. In essence, in example embodiments, a spot weight is assigned to or associated with a respective location inside the treatment target.

In other (e.g., IMRT) example embodiments, the information accessed or received by the TPS 150 may include, but is not limited to, the number of beamlets, a value (e.g., an initial value) of a weight for each beamlet (where the weight corresponds to a fraction or percentage of the beam energy), and a dosimetric objective function that accounts for the dose objective for the PTV and OARs. The weight of each beamlet may be expressed as a value of a MU corresponding to, for example, the beamlet's intensity or energy as a fraction or percentage of beam intensity or energy. As noted above with regard to FIG. 2B, each beamlet corresponds to a location in the treatment target. Similar to that of a spot weight, each beamlet weight can be referred to as a locational weight or location-based weight: a beamlet corresponds to a location, a weight corresponds to the beamlet, and thus the beamlet weight corresponds to the location. In essence, in these example embodiments, a beamlet weight is assigned to or associated with a respective location inside the treatment target.

When generating and optimizing the treatment plan, the TPS 150 can adjust the weights of the spots or beamlets with respect to, for example, the dosimetric objective function. Along with the goals already mentioned herein, another goal is to determine and output a set of final weights so that, during treatment, the treatment target will receive a homogenous dose (a uniform dose across the treatment target) and the delivered dose will conform more closely to the edges of the treatment target.

For various reasons (e.g., overcoming machine hardware constraints, increasing the dose rate, reducing delivery times, etc.), the clinician may desire and/or require the weights or MUs for respective spots and/or beamlets of the treatment plan to be above or below a certain threshold value (referred to as a minimum MU, minimum number of MUs or minimum MU value).

Conventional radiation treatment planning systems do not, however, provide a mechanism to adequately evaluate and control the objective of the treatment plan in real-time, thereby resulting in delay of radiation treatment to the potential detriment of the patient. Such delay also results in additional (and unnecessary) iterations of optimization, which utilizes increased processing resources and power unnecessarily.

One or more example embodiments provide a solution to at least these shortcomings of conventional radiation treatment planning systems. More specifically, for example, one or more example embodiments provide mechanisms to provide and/or display a rendering of a representation of one or more distributions of MUs (also referred to as MU distributions) for one or more (e.g., candidate) radiation therapy treatment plans to the clinician during treatment planning. Distributions of MUs of one or more candidate radiation therapy treatment plans may be displayed in various ways and/or at one or more different stages of the planning process (e.g., during plan optimization, beam planning and/or plan evaluation). In at least one example, the one or more MU distributions may be displayed as one or more renderings on a graphical user interface (GUI) displayed by output device 126. Example representations of MU distributions will be discussed later with regard to FIGS. 9A-15, wherein the renderings of representations are illustrated as displayed on output device (e.g., display device) 126.

By displaying representations of MU distributions of one or more radiation therapy treatment plans, an objective of a treatment plan may be evaluated and/or controlled in real-time, thereby increasing the speed at which a satisfactory treatment plan is determined, and the treatment performed on a patient. As a result, treatment of a patient may be expedited or, in other words, an expedited radiation therapy treatment may be carried out on the patient, thereby increasing the patient's chance of survival. The display of representations of MU distributions of one or more radiation therapy treatment plans also enables improved control and/or interaction with an optimizer to increase the speed at which a satisfactory treatment plan is determined, and the treatment performed on a patient. In one example, a treatment plan may be tuned, and the optimizer guided, to a result more quickly than in the conventional art. By reducing the time taken to arrive at a satisfactory treatment plan, the number of iterations of an optimizer is reduced, which reduces the processing power and resources required to generate a treatment plan for a patient.

Furthermore, radiation treatment plans typically include hundreds of thousands of spots or beamlets. As a result, it is conventionally impossible for a human to properly evaluate and control the objective of the treatment plan in real-time by analyzing MUs for a treatment plan or a field (beam) of a treatment plan. Display of the representations, according to example embodiments, allows a clinician to not only evaluate and/or control the objective of the treatment plan, which was previously impossible, but do so relatively quickly. For example, a clinician may verify (e.g., at a glance) whether a treatment plan is delivered above a minimum MU, verify (e.g., at a glance) whether a plan is sufficiently robust, assess whether a field has an MU distribution sufficient to be delivered in a relatively short period of time, assess whether a field is to be delivered in a sufficiently a robust way, determine whether a field is to contribute less dose than other fields (e.g., due to OAR constraints), etc. Although described with regard to a clinician evaluation for example purposes, other mechanisms for evaluating renderings of representations of MU distributions, such as machine learning, may be used.

Absent rendering and display of representations of MU distributions, according to one or more example embodiments, the above-mentioned advantages would not be achievable.

More detailed example embodiments will be discussed below with regard to FIGS. 5-15.

Figure 5:
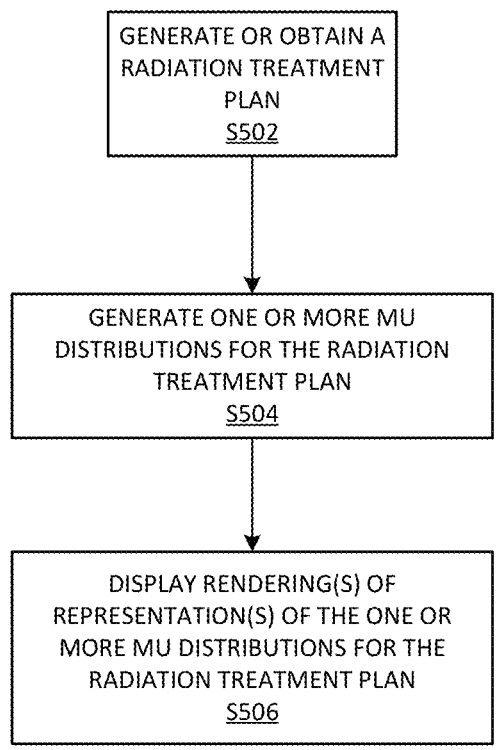
FIG. 5 is a flow chart illustrating a method according to example embodiments.

FIG. 5 is a flow chart illustrating a method for rendering and display of one or more representations of an MU distribution for a treatment plan, according to example embodiments. The method shown in FIG. 5 will be discussed as being performed by the computer system 100 in FIG. 1, and more specifically the TPS 150, during plan development/evaluation/optimization 304. Example embodiments should not, however, be limited to this example.

Referring to FIG. 5, at step S502 the TPS 150 generates a radiation therapy treatment plan for a patient. In one example, the generated radiation therapy treatment plan may be a candidate (proposed) radiation therapy treatment plan generated as discussed above with regard to FIGS. 3 and 4. Alternatively, the TPS 150 may obtain a previously generated radiation therapy treatment plan stored in, for example, memory 108 and/or 120. The radiation therapy treatment plan prescribes beam characteristics for a plurality of spots or beamlets in a treatment target. The beam characteristics include at least an MU associated with each of the plurality of spots or beamlets in the treatment plan.

At step S504, the TPS 150 generates one or more MU distributions for the radiation therapy treatment plan generated (or obtained) at step S502. The TPS 150 may generate the one or more MU distributions in any suitable, known manner. In one example, an MU distribution may be generated for the entire radiation therapy treatment plan. In another example, individual or separate MU distributions may be generated on a per-field (per-beam) basis; that is, for example, an MU distribution may be generated for each field (beam) of the radiation therapy treatment plan. In this case, an MU distribution may indicate, for each respective MU, a number of beamlets or spots in the field having the respective MU. The TPS 150 may generate an MU distribution for one or more (e.g., each) of the fields of the radiation therapy treatment plan.

Returning to FIG. 5, at step S506, the TPS 150 generates and displays, via a GUI on output device 126, a rendering of one or more (visual) representations of (e.g., each of) the one or more MU distributions for the radiation therapy treatment plan generated (or obtained) at step S502. In one example, the representation of the MU distribution may be a histogram in which the horizontal (x) axis represents MUs and the vertical (y) axis represents the number of times a beamlet or spot with a given MU is present in the radiation therapy treatment plan.

In some instances, the absolute number of beamlets or spots having a given MU may not be of particular importance to a treatment planner or planning user. In such cases, a full histogram representation of a MU distribution may be simplified into a density chart in which the area where bars are grouped more closely indicating that more beamlets or spots are present in that area and have MUs similar to or relatively close to a particular MU. In this case, a representation of an MU distribution may be in the form of a density chart or color density chart.

In another example, an MU distribution may be visually represented in the form of a combination of a histogram and a corresponding density chart. The histogram and the density chart may be displayed together in a single rendering or in separate renderings in the GUI.

According to one or more example embodiments, for representations of individual fields of a radiation therapy treatment plan, histograms and/or density charts for respective fields may be displayed one above the other, side-by-side or overlayed on one another as desired. The display of the representations may be configured by a clinician as desired.

FIGS. 9A, 9B, 9C and 9D illustrate example renderings of histograms representing MU distributions for radiation therapy treatment plans, according to example embodiments. In the examples shown in FIGS. 9A-9D, MUs of a radiation therapy treatment plan are displayed for the whole plan as a histogram. The horizontal (x) axis represents the MUs and the vertical (y) axis represents the number of times a beamlet or spot with given MU is present in the plan. Although not shown, the scale of the y-axis may alternatively be set to logarithmic.

Figure 9A:
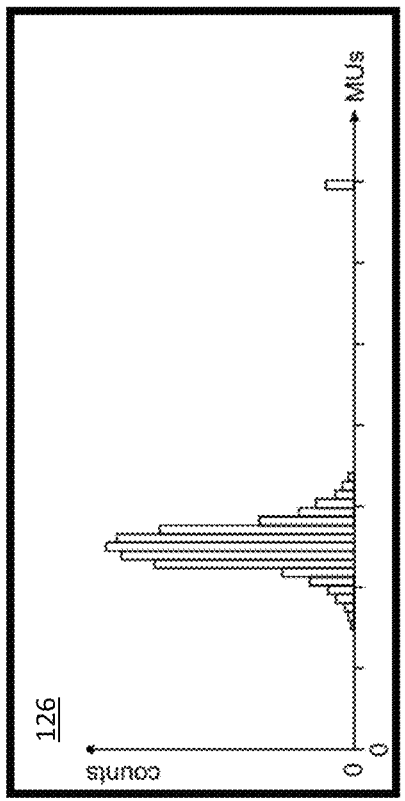
FIGS. 9A, 9B, 9C and 9D illustrate example graphical user interface (GUI) renderings of representations of monitor unit (MU) distributions for radiation therapy treatment plans, according to example embodiments.

As shown, FIG. 9A illustrates a histogram representation of an MU distribution for a radiation therapy treatment plan with relatively balanced MUs among the beamlets or spots.

Figure 9B:
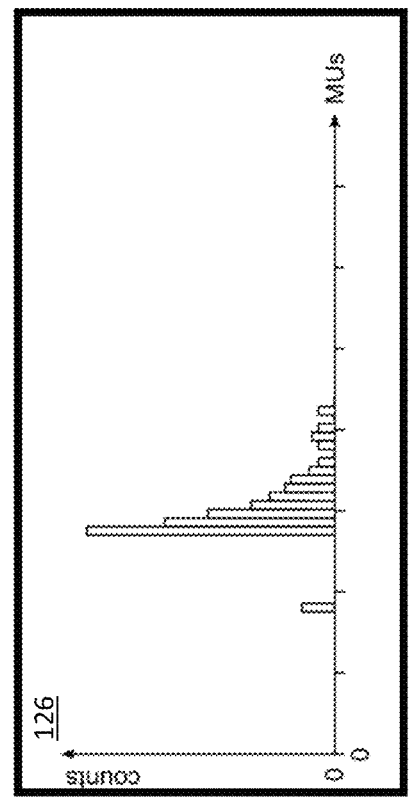

FIG. 9B illustrates a histogram representation of an MU distribution for a radiation therapy treatment plan similar to FIG. 9A, but that has one beamlet or spot with a (e.g., significantly or substantially) higher MU than other beamlets or spots.

Figure 9C:
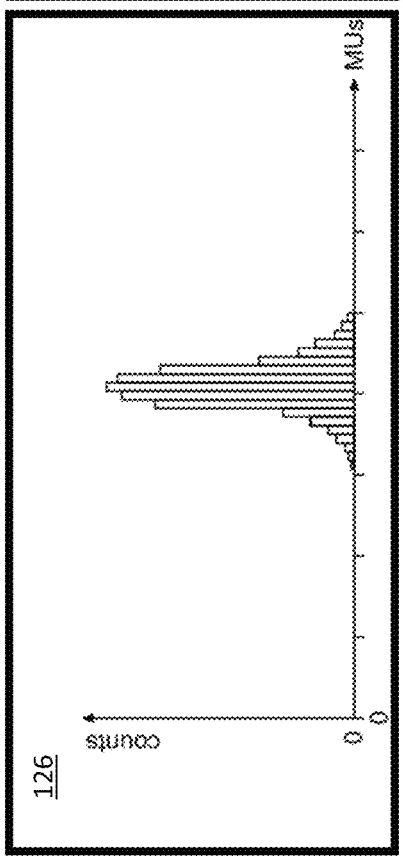

FIG. 9C illustrates a histogram representation of an MU distribution for a radiation therapy treatment plan with spots or beamlets with MUs above a threshold value. In this example, the threshold value is a minimum MU, which is designated "minimum MU" in FIG. 9C.

Figure 9D:
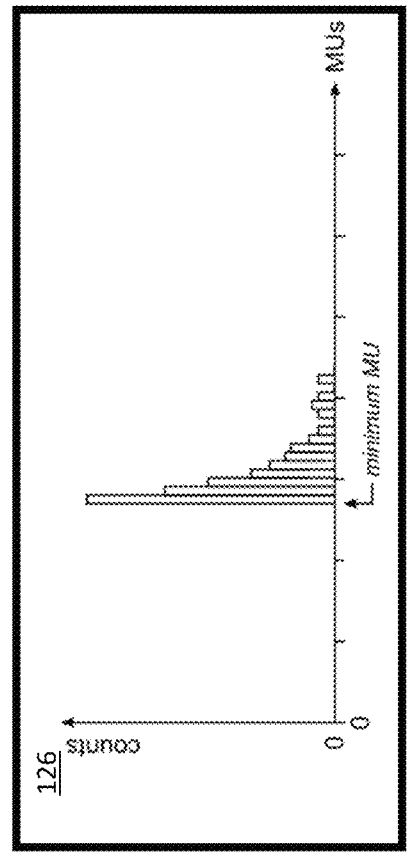

FIG. 9D illustrates a histogram representation of an MU distribution for a radiation therapy treatment plan where a threshold (e.g., minimum MU) constraint was applied as in FIG. 9C, but one spot or beamlet is below the threshold, thereby violating the constraint.

Figure 10:
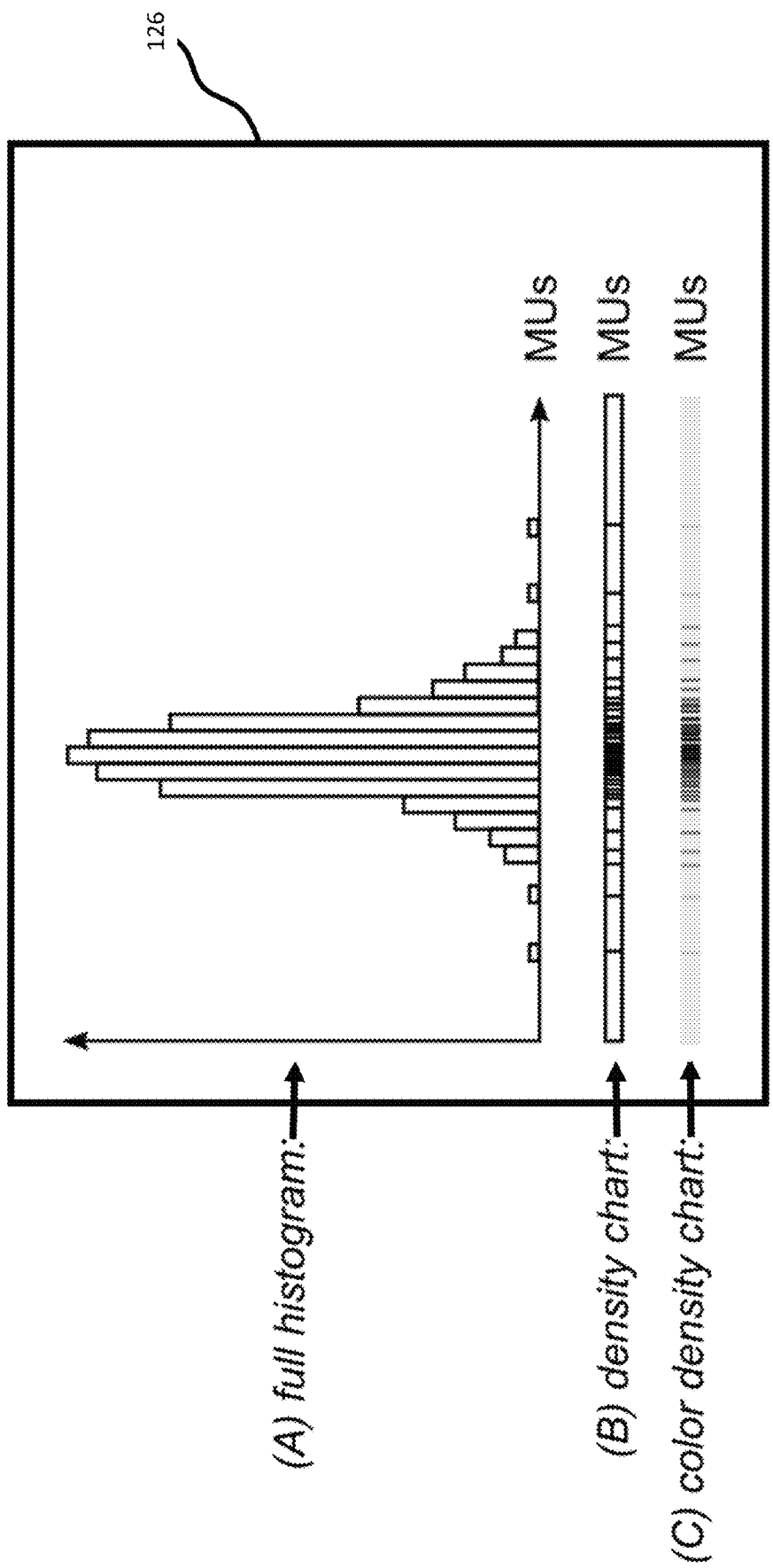
FIG. 10 illustrates an example GUI rendering of a representation of an MU distribution for a radiation therapy treatment plan, according to example embodiments.

FIG. 10 illustrates an example rendering of a combination of representations of an MU distribution in which a full histogram (A) is illustrated along with (e.g., above) a corresponding density chart (B) and a corresponding color density chart (C). The color density chart illustrates an overlaying gradient color (or gray) scale, arranged along with the density chart and the histogram. It is noted that the gradient color scale may be either linear or logarithmic as desired.

As noted above, the TPS 150 may display one or more individual or separate MU distributions for individual fields of a radiation therapy treatment plan. Display of representations of MU distributions for individual fields may be desirable and/or useful, for example, when: one of the fields needs specifically to be delivered in a relatively short time, one of the fields needs specifically to be delivered in a more robust way, one of the fields contributes significantly or substantially less dose than the others (e.g., due to OAR constraints), etc.

Figure 11:
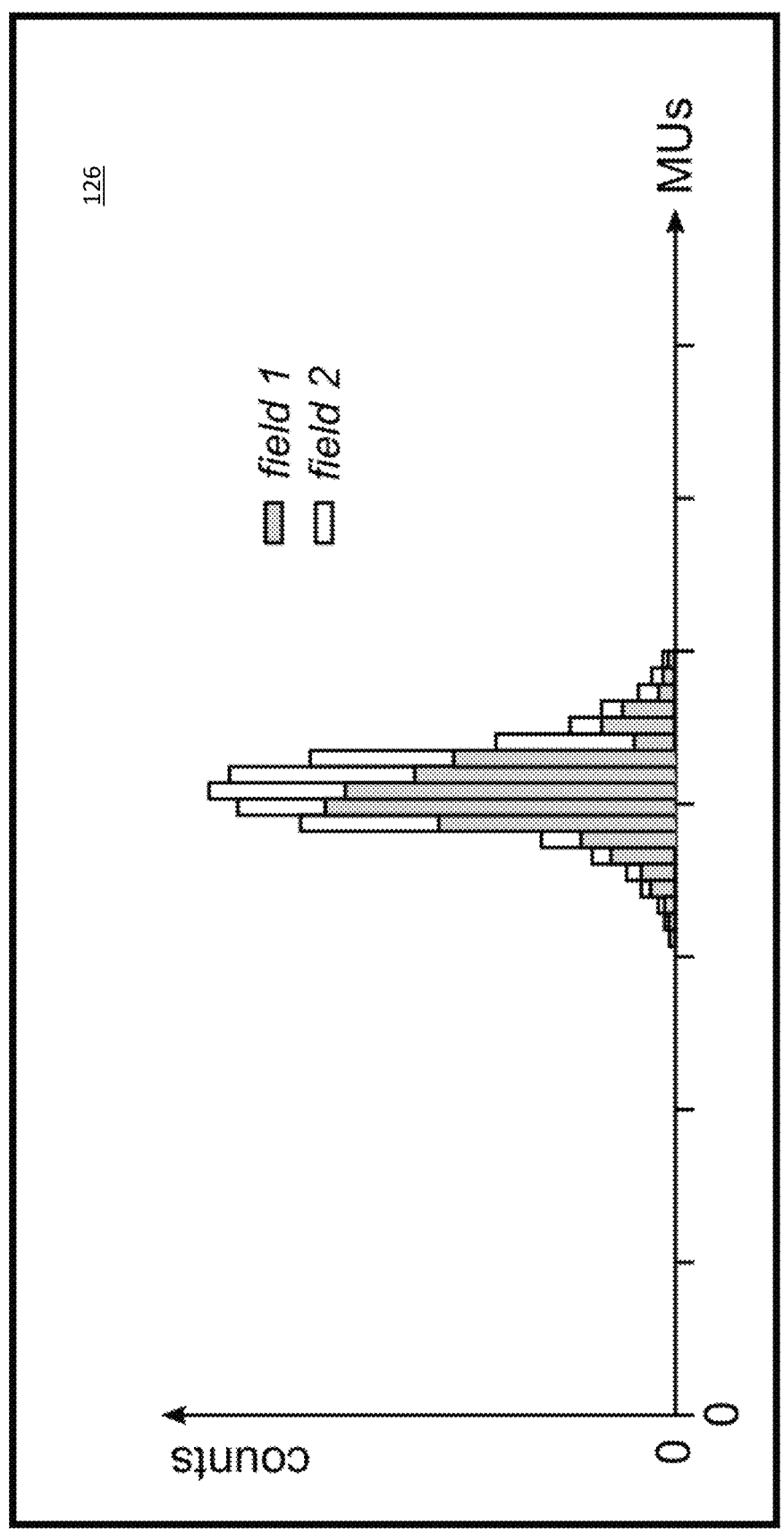
FIG. 11 illustrates another example GUI rendering of representations of MU distributions for a radiation therapy treatment plan, according to example embodiments.

FIG. 11 illustrates an example rendering of a representation of an MU distribution per field for a radiation therapy treatment plan. In FIG. 11, MU distributions for two fields (field 1 and field 2) are displayed on the same histogram. In this example, the histograms for the individual fields are stacked vertically such that the histogram illustrates the MU distribution of the whole radiation therapy treatment plan. As shown, the MU distributions may be delineated using a different color (or gray scale) for each field.

Figure 12:
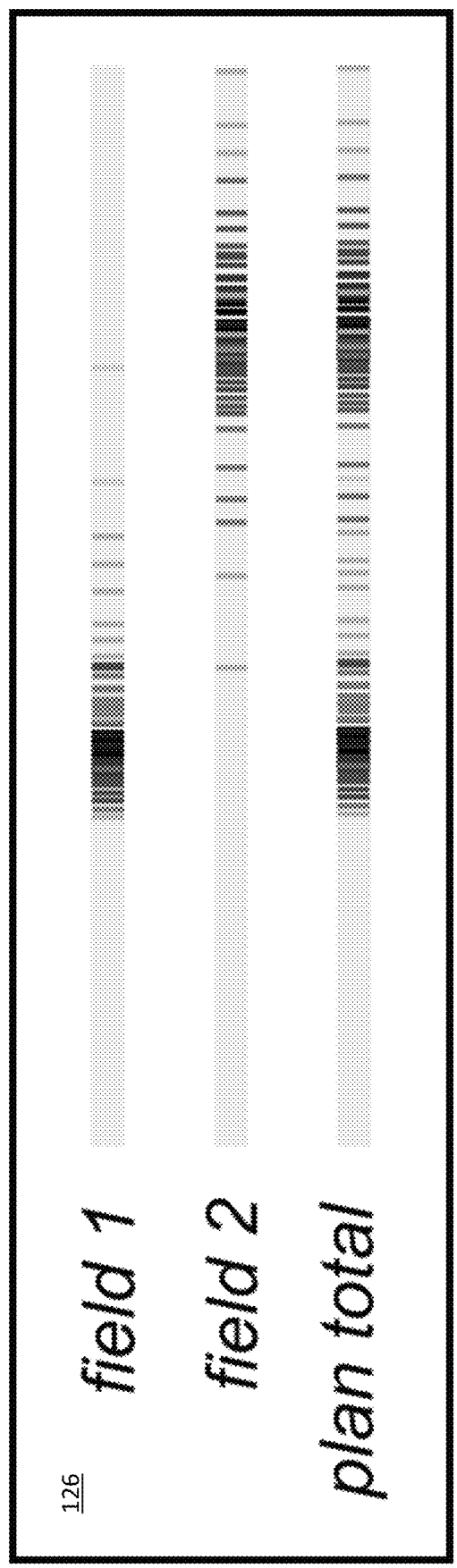
FIG. 12 illustrates an example GUI rendering of representations of MU distributions for a radiation therapy treatment plan, according to example embodiments.

FIG. 12 illustrates an example rendering of a combination of representations of individual MU distributions for respective fields for a radiation therapy treatment plan along with a representation of an MU distribution for the entire radiation therapy treatment plan. In this example, the MU distributions are represented as distinct color density charts for each respective field. The MU distribution of the treatment plan is shown on a separate axis (plan total) with the density charts for the respective fields overlayed on one another.

Figure 13:
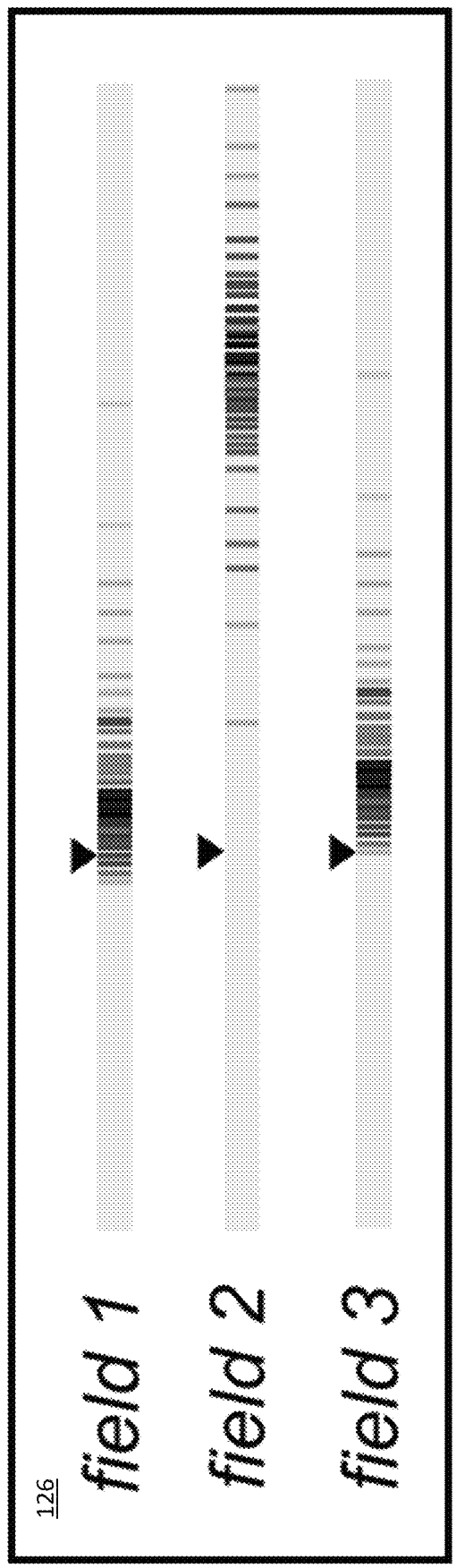
FIG. 13 illustrates an example GUI rendering of representations of MU distributions including minimum MU objectives for a radiation therapy treatment plan, according to example embodiments.

FIG. 13 illustrates an example rendering of the combination of color density charts shown in FIG. 12 along with a minimum MU value indicator on each density chart. During optimization, a visual representation of the MU distribution at each iteration provides direct feedback to indicate and/or provide understanding regarding whether the MU-related objectives are being achieved. The simplest objectives that the user may want to set are minimum and maximum values between which the MU distribution must be constrained. According to one or more example embodiments, at least minimum MU values may be set via a GUI including the rendering shown in FIG. 13. For example, if implemented as a GUI on a touch screen display, a user may touch a portion of one or more of the color density charts to establish and/or adjust a minimum and/or maximum MU for the field or the radiation therapy treatment plan.

Figure 6:
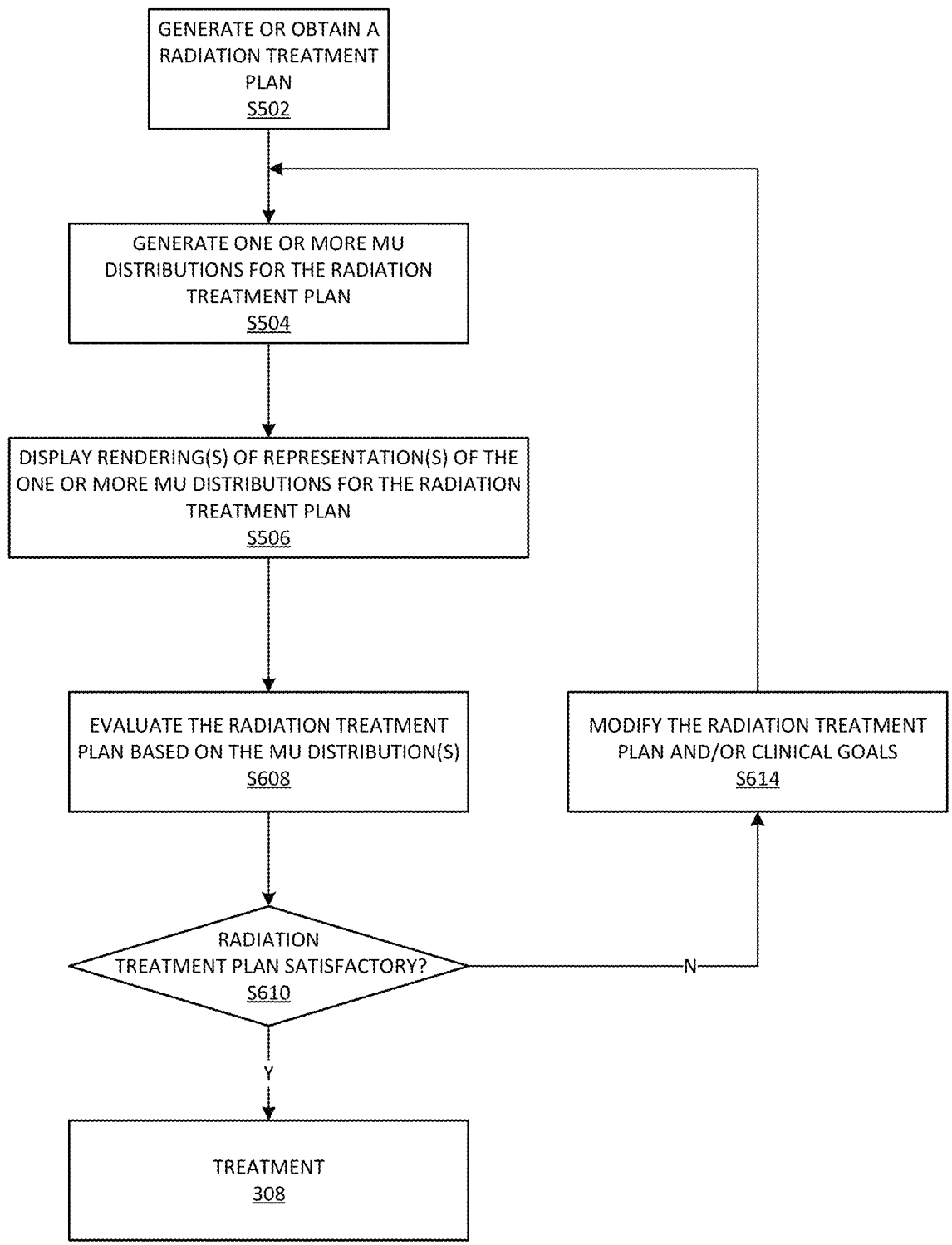
FIG. 6 is a flow chart illustrating another method according to example embodiments.

FIG. 6 is a flow chart illustrating a method for radiation therapy treatment according to example embodiments. The method shown in FIG. 6 includes the method for rendering and display shown and described with regard to S502-S506 in FIG. 5. Accordingly, these steps will not be described in detail here for the sake of brevity. Moreover, the example embodiment shown in FIG. 6 will be described with regard to the system shown in FIG. 1. However, example embodiments should not be limited to this example.

Referring to FIG. 6, after displaying of the one or more representations of MU distributions for the candidate radiation therapy treatment plan at step S506, the treatment plan may be evaluated based on the rendered representation(s) at step S608. In one example, the treatment plan may be evaluated based on a preferred treatment plan or desired characteristics of a preferred treatment plan. More specifically, for example, a treatment planner or the TPS may desire, prefer and/or require a plan for which no MU values are below a certain threshold value (e.g., a certain minimum MU value), and evaluate the treatment plan based on this desire, preference and/or requirement. In this case, if the treatment plan does not include any MU values below the threshold (all MU values are above the threshold), then the treatment plan may be deemed satisfactory. On the other hand, if the treatment plan includes one or more MU values below the threshold, then the treatment plan may be deemed unsatisfactory. Although discussed with regard to this example, example embodiments should not be limited to only this example case.

If the radiation therapy treatment plan is determined to be satisfactory at S610, then the radiation therapy treatment plan may be further optimized and/or output by the TPS 150 for use in treatment of the patient (e.g., via the radiation therapy machine 1000) at 308. Step 308 in FIG. 3 is the same as step 308 in FIG. 3 and thus a detailed description will be omitted for the sake of brevity.

Returning to step S610, if the radiation therapy treatment plan is determined to be unsatisfactory, then the radiation therapy treatment plan and/or clinical goals may be modified by the TPS 150 at step S614.

After modifying the radiation therapy treatment plan and/or clinical goals at step S614, the process returns to step S504 at which the TPS 150 generates a MU distribution for the updated radiation therapy treatment plan. The process then proceeds to step S506 and continues as discussed herein.

As discussed below, one or more example embodiments also provide mechanisms for a clinician to adjust and/or define a cost (objective) function for optimization of a radiation treatment plan via interaction with a GUI.

Figure 7:
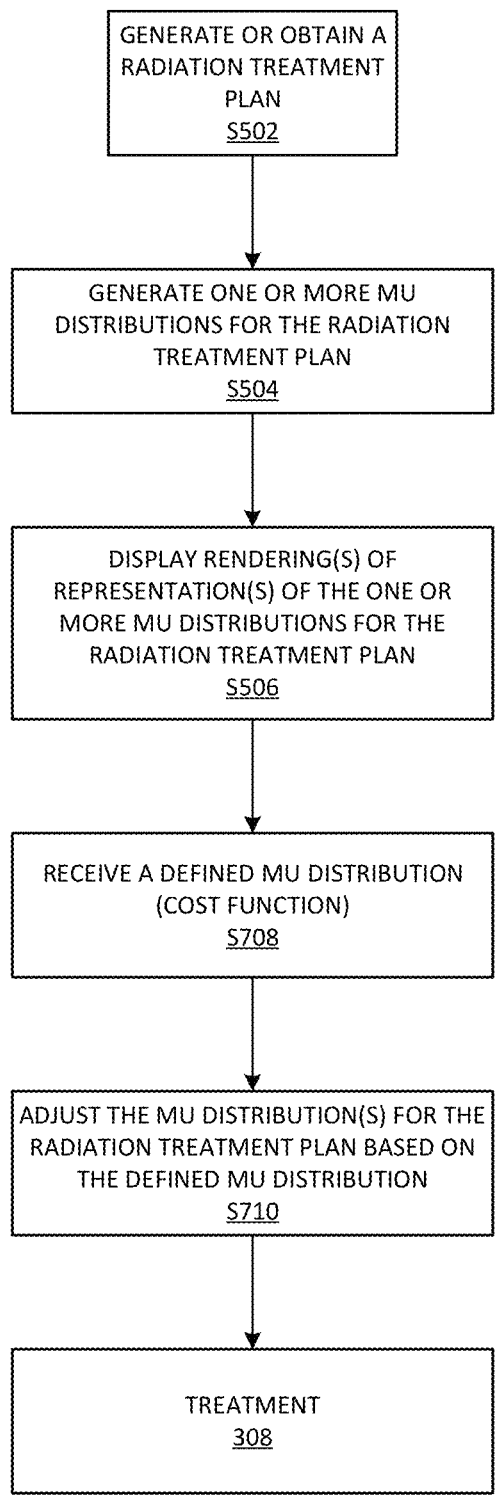
FIG. 7 is a flow chart illustrating yet another method according to example embodiments.

FIG. 7 is a flow chart illustrating a method for radiation therapy treatment according to example embodiments. As with the method shown in FIG. 6, the method shown in FIG. 7 includes the method for rendering and display shown and described with regard to S502-S506 in FIG. 5. Accordingly, these steps will not be described again in detail here for the sake of brevity. Moreover, the example embodiment shown in FIG. 7 will be described with regard to the system shown in FIG. 1. However, example embodiments should not be limited to this example.

Referring to FIG. 7, after displaying of the GUI including a rendering of a representation of the MU distribution for the candidate radiation therapy treatment plan (e.g., on display device 126), the TPS 150 receives a defined MU distribution for the radiation therapy treatment plan. In at least one example embodiment, a clinician may manually define the desired MU distribution by defining a cost (objective) function for the radiation therapy treatment plan or field thereof via the interface of the TPS 150. In one example, the GUI may be a touch screen or other input device enabling the clinician to interact with the TPS 150 to define the cost function. In another example, the clinician may interact with the TPS 150 via a mouse, keyboard or other input device.

In one example, the GUI for defining the cost function may be analogous to an audio equalizer interface. The clinician may draw (e.g., via the touch screen or other input device) a spline on top of the displayed histogram representation of the MU distribution to define the cost function for the radiation treatment plan or field thereof, and then adjust the cost function by manipulating the displayed histogram at adjustment points.

Figure 14:
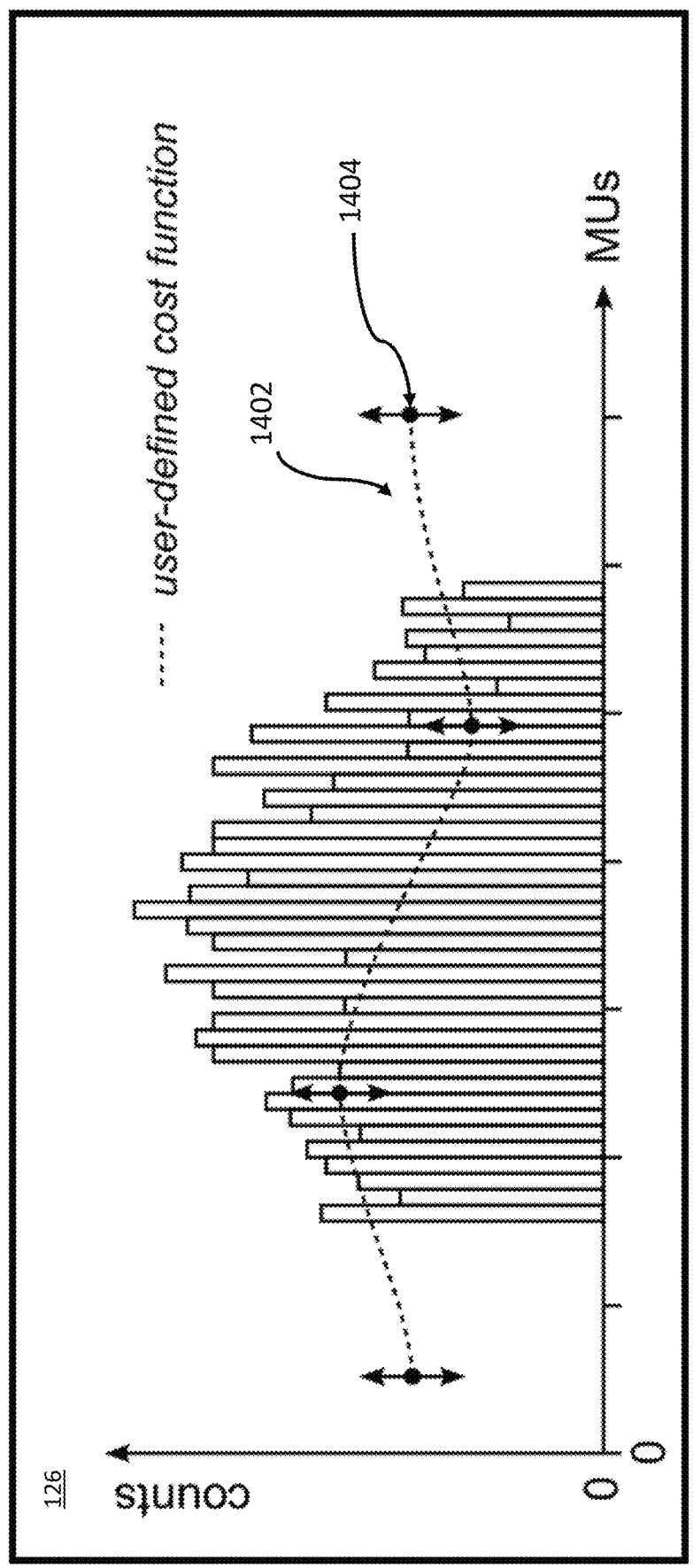
FIG. 14 illustrates an example GUI rendering of a representation of an MU distribution for a radiation therapy treatment plan, according to example embodiments.

FIG. 14 illustrates an example GUI rendering of a user adjustable representation of an MU distribution for a radiation therapy treatment plan. As shown, a spline 1402 may be drawn on top of the histogram to define the cost function. Analogous to an audio equalizer interface, adjustment points 1404 may be moved up and down via interaction with the GUI (e.g., via touch screen or other input device) to adjust the cost function for the corresponding radiation therapy treatment plan.

Returning to FIG. 7, at step S710, the TPS 150 adjusts the MU distribution and the displayed representation of the MU distribution (as needed) based on the input provided at step S708. In at least one example embodiment, the histogram or other representation of the MU distribution may update (e.g., as discussed above with regard to FIGS. 3-4) in real-time based on the adjustments to the cost function via the GUI.

Once adjusted, at step 308, the radiation treatment plan may be output and radiation treatment performed (e.g., via the radiation therapy machine 1000) as discussed above with regard to FIG. 3 with or without further evaluation and optimization.

One or more example embodiments may also provide a mechanism for evaluating and/or comparing two or more candidate radiation therapy treatment plans.

Figure 8:
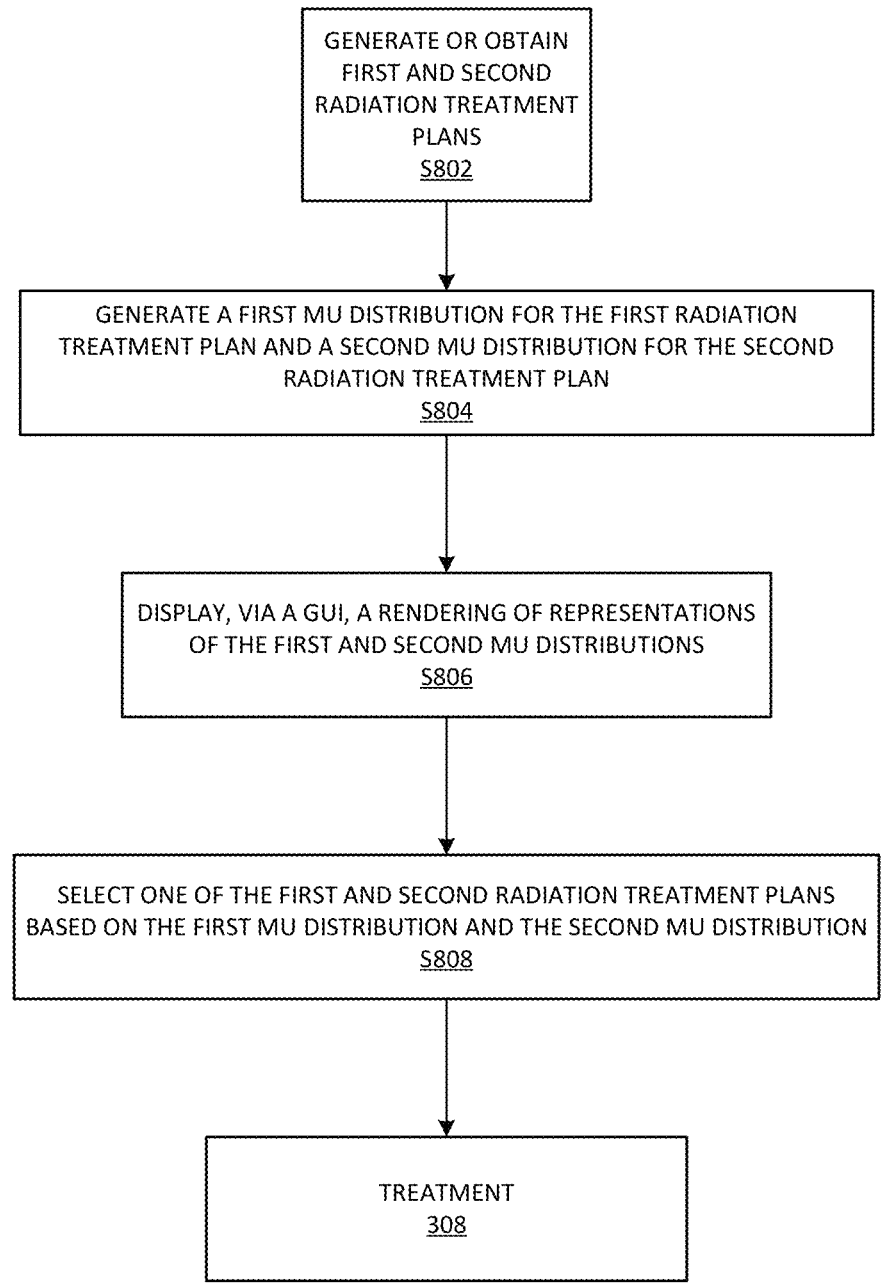
FIG. 8 is a flow chart illustrating yet another method according to example embodiments.

FIG. 8 is a flow chart illustrating a method for radiation therapy treatment including a comparison of two or more radiation therapy treatment plans, according to example embodiments. The example embodiment shown in FIG. 8 will be discussed with regard to two radiation therapy treatment plans. However, example embodiments should not be limited to this example. Rather, any number of radiation therapy treatment plans may be used. Moreover, the example embodiment shown in FIG. 8 will be discussed with regard to a first MU distribution and corresponding representation and a second MU distribution and corresponding representation. It should be understood, however, that example embodiments are not limited to a single MU distribution and corresponding representation. Rather, one or more MU distributions and corresponding representations may be generated for each of the first and second radiation therapy treatment plans.

The example embodiment shown in FIG. 8 will be described with regard to the system shown in FIG. 1. However, example embodiments should not be limited to this example.

Referring to FIG. 8, at step S802 the TPS 150 generates or obtains a first and a second radiation therapy treatment plan. Each of the first and second radiation treatment plans may be generated or obtained in the same or substantially the same manner as discussed above with regard to step S502 in FIG. 5.

At step S804, the TPS 150 generates a first MU distribution for the first radiation therapy treatment plan generated (or obtained) at step S802 and generates a second MU distribution for the second radiation therapy treatment plan generated (or obtained) at step S802. Each of the first and second MU distributions may be generated or obtained in the same or substantially the same manner as discussed above with regard to step S504 in FIG. 5.

At step S806, the TPS 150 displays a GUI including a rendering of at least one representation of the first MU distribution for the first candidate radiation therapy treatment plan and at least one representation of the second MU distribution for the second candidate radiation therapy treatment plan. The representations of the first and second MU distributions may be displayed concurrently and/or simultaneously in a single rendering of the GUI. In one example, each MU distribution may be rendered as a histogram and/or density chart as described herein. The histograms (or other representations, such as a density charts) for each of the first and second candidate radiation therapy treatment plans may be overlayed on one another for comparison. Alternatively, or in combination, the histograms (or other representations, such as a density charts) for the first and second candidate radiation therapy treatment plans may be arranged side-by-side. In one example, the MU distributions may be represented as, for example, semi-transparent histograms overlayed on the same graph and/or as two distinct color density charts arranged one above the other or side-by-side.

Figure 15:
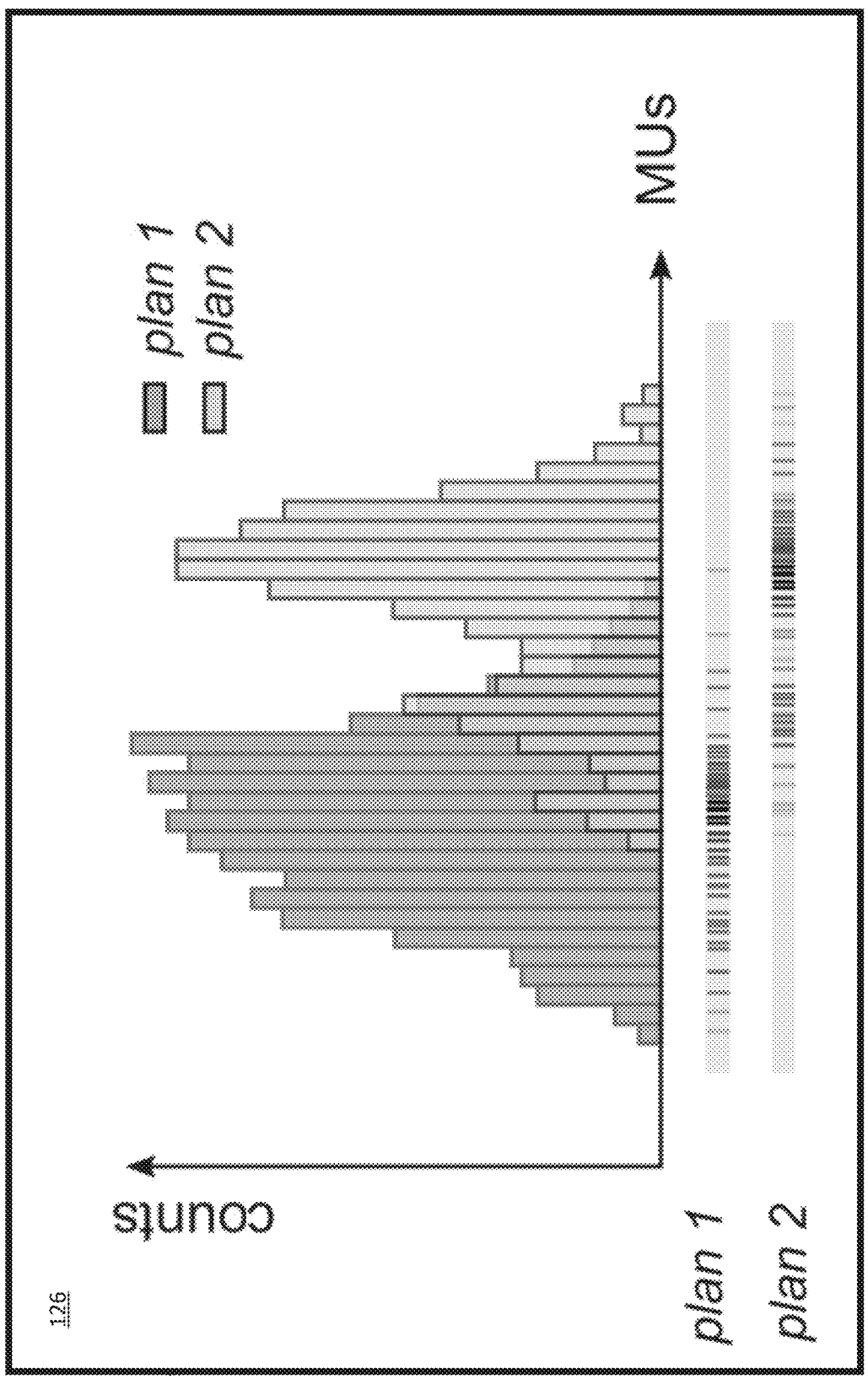
FIG. 15 illustrates an example GUI rendering of representations of MU distributions for two candidate radiation therapy treatment plans, according to example embodiments.

FIG. 15 illustrates an example GUI rendering of representations of MU distributions for two candidate radiation therapy treatment plans. In the example shown in FIG. 15, the MU distributions are represented as, for example, semi-transparent histograms partially overlayed on one another on the same graph, and also as two distinct color density charts arranged one above the other.

Returning to FIG. 8, at step S808 the TPS 150 may select one of the first and second candidate radiation therapy treatment plans based on the displayed representations of the MU distributions for the treatment plans. In one example, a clinician may select one of the two radiation treatment plans via the TPS interface.

At 308, radiation treatment (with or without further evaluation and optimization) may be performed on the patient (e.g., via the radiation therapy machine 1000) according to the selected radiation therapy treatment plan as discussed above. The following is a list of non-limiting illustrative embodiments disclosed herein:

Illustrative embodiment 1. A system comprising: at least one processor and a memory storing computer executable instructions. The at least one processor is configured to execute the computer executable instructions to cause the system to: generate or obtain a first radiation treatment plan for a treatment target in a patient, the first radiation treatment plan prescribing beam characteristics for a plurality of beamlets or spots in the treatment target, the beam characteristics including a monitor unit value associated with each of the plurality of beamlets or spots in at least a first field; and display, via a graphical user interface, at least one representation of a first distribution of monitor units for the first radiation treatment plan, the at least one representation of the first distribution of monitor units indicating, for each respective monitor unit value, a number of beamlets or spots in at least the first field having the respective monitor unit value.

Illustrative embodiment 2. The system according to illustrative embodiment 2, wherein the at least one processor is configured to execute the computer executable instructions to cause the system to display the at least one representation during radiation treatment planning optimization.

Illustrative embodiment 3. The system of any of the preceding illustrative embodiments, wherein the at least one processor is configured to execute the computer executable instructions to cause the system to display a plurality of representations of the first distribution of monitor units via the graphical user interface.

Illustrative embodiment 4. The system of any of the preceding illustrative embodiments, wherein the plurality of representations of the first distribution of monitor units includes at least one histogram and at least one density chart.

Illustrative embodiment 5. The system of any of the preceding illustrative embodiments, wherein the plurality of representations of the first distribution of monitor units are displayed concurrently via the graphical user interface.

Illustrative embodiment 6. The system of any of the preceding illustrative embodiments, wherein the plurality of representations of the first distribution of monitor units includes at least one histogram and at least one density chart.

Illustrative embodiment 7. The system of any of the preceding illustrative embodiments, further comprising: a radiation therapy machine configured to apply radiation therapy treatment to the treatment target based on the first radiation treatment plan after display of the at least one representation.

Illustrative embodiment 8. The system of any of the preceding illustrative embodiments, wherein the at least one representation of the first distribution of monitor units includes at least one of a histogram or a density chart.

Illustrative embodiment 9. The system of any of the preceding illustrative embodiments, wherein the at least one representation of the first distribution of monitor units includes a density chart, and the at least one processor is configured to execute the computer executable instructions to cause the system to display a marker on the density chart, the marker indicating a minimum monitor unit for at least one of the first radiation treatment plan or the first field.

Illustrative embodiment 10. The system of any of the preceding illustrative embodiments, wherein the at least one processor is configured to execute the computer executable instructions to cause the system to display, via the graphical user interface, at least one representation of a second distribution of monitor units for a second field of the first radiation treatment plan, the at least one representation of the second distribution of monitor units indicating, for each respective monitor value, a number of beamlets or spots in the second field having the respective monitor unit value.

Illustrative embodiment 11. The system of any of the preceding illustrative embodiments, wherein the at least one representation of the first distribution and the at least one representation of the second distribution are overlayed on one another.

Illustrative embodiment 12. The system of any of the preceding illustrative embodiments, wherein the at least one processor is configured to execute the computer executable instructions to cause the system to: receive a defined distribution of monitor units for the first radiation treatment plan, and adjust the first distribution of monitor units based on the defined distribution of monitor units.

Illustrative embodiment 13. The system of any of the preceding illustrative embodiments, wherein the at least one representation of the first distribution is a color density chart.

Illustrative embodiment 14. A system comprising: at least one processor and a memory storing computer executable instructions. The at least one processor is configured to execute the computer executable instructions to cause the system to: generate a first candidate radiation treatment plan for a treatment target in a patient, the first candidate radiation treatment plan prescribing first beam characteristics for a plurality of beamlets or spots in the treatment target, the first beam characteristics including a first monitor unit value associated with each of the plurality of beamlets or spots; generate a second candidate radiation treatment plan for the treatment target in the patient, the second candidate radiation treatment plan prescribing second beam characteristics for the plurality of beamlets or spots in the treatment target, the second beam characteristics including a second monitor unit value associated with each of the plurality of beamlets or spots; display, via a graphical user interface, a at least one representation of a first distribution of monitor units for the first candidate radiation treatment plan, the at least one representation of the first distribution of monitor units indicating, for each respective first monitor value, a first number of beamlets or spots having the respective first monitor unit value; and display, via the graphical user interface, at least one representation of a second distribution of monitor units for the second candidate radiation treatment plan, the at least one representation of the second distribution of monitor units indicating, for each respective second monitor value, a second number of beamlets or spots having the respective second monitor unit value.

Illustrative embodiment 15. The system of illustrative embodiment 14, wherein the at least one representation of the first distribution and the at least one representation of the second distribution include at least one of a histogram or a density chart.

Illustrative embodiment 16. The system of any one of illustrative embodiments 14-15, wherein the at least one representation of the first distribution and the at least one representation of the second distribution are overlayed on one another.

Illustrative embodiment 17. The system of any one of illustrative embodiments 14-16, wherein the at least one processor is configured to execute the computer executable instructions to cause the system to select one of the first candidate radiation treatment plan or the second candidate radiation treatment plan as a radiation treatment plan for the patient based on the first distribution and the second distribution.

Illustrative embodiment 18. The system of any one of illustrative embodiments 14-17, further comprising: a radiation therapy machine configured to apply radiation therapy treatment to the patient based on the radiation treatment plan for the patient.

Illustrative embodiment 19. The system of any one of illustrative embodiments 14-18, wherein at least one of the at least one representation of the first distribution or the at least one representation of the second distribution includes a color density chart.

Illustrative embodiment 20. The system of any one of illustrative embodiments 14-19, wherein the at least one processor is configured to execute the computer executable instructions to cause the system to display the at least one representation of the first distribution of monitor units and the at least one representation of the second distribution of monitor units during radiation treatment planning optimization.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware, for example, processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "memory," "storage medium," "processor readable medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, medical systems, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A system comprising:
 a memory storing computer executable instructions; and
 at least one processor configured to execute the computer executable instructions to cause the system to
  generate or obtain a first radiation treatment plan for a treatment target in a patient, the first radiation treatment plan prescribing beam characteristics for a plurality of beamlets or spots in the treatment target, the beam characteristics including a monitor unit value associated with each of the plurality of beamlets or spots in at least a first field, and
  display, via a graphical user interface, at least one representation of a first distribution of monitor units for the first radiation treatment plan, the at least one representation of the first distribution of monitor units indicating, for each respective monitor unit value, a number of beamlets or spots in at least the first field having the respective monitor unit value.

2. The system of claim 1, wherein the at least one processor is configured to execute the computer executable instructions to cause the system to display the at least one representation during radiation treatment planning optimization.

3. The system of claim 1, wherein the at least one processor is configured to execute the computer executable instructions to cause the system to display a plurality of representations of the first distribution of monitor units via the graphical user interface.

4. The system of claim 3, wherein the plurality of representations of the first distribution of monitor units includes at least one histogram and at least one density chart.

5. The system of claim 3, wherein the plurality of representations of the first distribution of monitor units are displayed concurrently via the graphical user interface.

6. The system of claim 5, wherein the plurality of representations of the first distribution of monitor units includes at least one histogram and at least one density chart.

7. The system of claim 1, further comprising:
a radiation therapy machine configured to apply radiation therapy treatment to the treatment target based on the first radiation treatment plan after display of the at least one representation.

8. The system of claim 1, wherein the at least one representation of the first distribution of monitor units includes at least one of a histogram or a density chart.

9. The system of claim 1, wherein
the at least one representation of the first distribution of monitor units includes a density chart, and
the at least one processor is configured to execute the computer executable instructions to cause the system to display a marker on the density chart, the marker indicating a minimum monitor unit for at least one of the first radiation treatment plan or the first field.

10. The system of claim 1, wherein the at least one processor is configured to execute the computer executable instructions to cause the system to display, via the graphical user interface, at least one representation of a second distribution of monitor units for a second field of the first radiation treatment plan, the at least one representation of the second distribution of monitor units indicating, for each respective monitor unit value, a number of beamlets or spots in the second field having the respective monitor unit value.

11. The system of claim 10, wherein the at least one representation of the first distribution and the at least one representation of the second distribution are overlayed on one another.

12. The system of claim 1, wherein the at least one processor is configured to execute the computer executable instructions to cause the system to
receive a defined distribution of monitor units for the first radiation treatment plan, and
adjust the first distribution of monitor units based on the defined distribution of monitor units.

13. The system of claim 1, wherein the at least one representation of the first distribution is a color density chart.

14. A system comprising:
a memory storing computer executable instructions; and
at least one processor configured to execute the computer executable instructions to cause the system to
generate or obtain a first candidate radiation treatment plan for a treatment target in a patient, the first candidate radiation treatment plan prescribing first beam characteristics for a plurality of beamlets or spots in the treatment target, the first beam characteristics including a first monitor unit value associated with each of the plurality of beamlets or spots,
generate or obtain a second candidate radiation treatment plan for the treatment target in the patient, the second candidate radiation treatment plan prescribing second beam characteristics for the plurality of beamlets or spots in the treatment target, the second beam characteristics including a second monitor unit value associated with each of the plurality of beamlets or spots,
display, via a graphical user interface, at least one representation of a first distribution of monitor units for the first candidate radiation treatment plan, the at least one representation of the first distribution of monitor units indicating, for each respective first monitor unit value, a first number of beamlets or spots having the respective first monitor unit value, and
display, via the graphical user interface, at least one representation of a second distribution of monitor units for the second candidate radiation treatment plan, the at least one representation of the second distribution of monitor units indicating, for each respective second monitor unit value, a second number of beamlets or spots having the respective second monitor unit value.

15. The system of claim 14, wherein the at least one representation of the first distribution and the at least one representation of the second distribution include at least one of a histogram or a density chart.

16. The system of claim 14, wherein the at least one representation of the first distribution and the at least one representation of the second distribution are overlayed on one another.

17. The system of claim 14, wherein the at least one processor is configured to execute the computer executable instructions to cause the system to select one of the first candidate radiation treatment plan or the second candidate radiation treatment plan as a radiation treatment plan for the patient based on the first distribution and the second distribution.

18. The system of claim 17, further comprising:
a radiation therapy machine configured to apply radiation therapy treatment to the patient based on the radiation treatment plan for the patient.

19. The system of claim 14, wherein at least one of the at least one representation of the first distribution or the at least one representation of the second distribution includes a color density chart.

20. The system of claim 14, wherein the at least one processor is configured to execute the computer executable instructions to cause the system to display the at least one representation of the first distribution of monitor units and the at least one representation of the second distribution of monitor units during radiation treatment planning optimization.

* * * * *